May 11, 1965

C. C. HACH 3,183,191

STAIN AND RUST REMOVING COMPOSITION

Filed April 19, 1960

INVENTOR.
Clifford C. Hach
BY
Wolfe, Hubbard, Voit & Osann
Attys.

3,183,191
STAIN AND RUST REMOVING COMPOSITION
Clifford C. Hach, Ames, Iowa, assignor to Hach Chemical Company, Ames, Iowa, a corporation of Iowa
Filed Apr. 19, 1960, Ser. No. 23,190
5 Claims. (Cl. 252—105)

The present invention relates to a composition for dissolving and removing stains and particularly for dissolving rust and removing rust stains. More specifically, the invention relates to a composition finding particular, but not necessarily exclusive, utility for removing rust from water softening equipment, from ion exchange resins and minerals used in such equipment, and from other surfaces and objects on which rust and like stains accumulate.

The invention has as its principal objective the removal of rust accumulations from equipment such as water softening equipment and ion exchange resins in which the efficiency is reduced as rust collects, and the removal of rust stains and like surface stains from sinks, walls, and the like, the appearance of which is adversely affected by such stains.

One object of the present invention is to provide an improved composition capable of dissolving rust, removing rust stains and preventing the accumulation of rust. More specifically, it is an object of the invention to provide a composition which is useful for removing rust from water treatment apparatus such as water softening equipment, ion exchange apparatus, and the ion exchange resins and minerals used therein.

Another object of the present invention is to provide a rust and stain removing composition which can be incorporated into detergents, cleansers, soaps and the like for household and industrial use.

Still another object of the present invention is to provide a rust removing composition of the foregoing character which is inexpensive, is simple and economical to use, which is highly effective in removing rust, rust stains and like stains and precipitates, and which does not leave a residual or unsightly dark precipitate in place of the stain removed. A further and more detailed object of the invention is to provide a composition of the above type which is capable of removing rust stains from sinks, floors, walls, automobile surfaces and the like.

A related object of the present invention is to provide an improved method for making a rust removing composition of the above character. Still a further object is to provide such a process which is inexpensive, simple to operate and which efficiently produces a rust removing composition of the desired character without necessitating the batching and mixing of various dry powder components.

Still a further object of the invention is to provide an improved water softener regenerating composition which contains therein an addition to the regenerating salt a rust removal and rust preventative substance embodying the present invention.

Other objects and advantages of the present invention will become apparent as the following description proceeds taken in connection with the accompanying drawings wherein.

The present invention is embodied in a composition of salts which are active in aqueous solution to dissolve or remove stains such as iron oxide or rust. While these salts taken individually might have some effect in dissolving or removing rust and like stains, it is in the particular combination of salts, wherein the salts act together synergistically to remove or dissolve a greater amount of rust and stain than is possible using the salts individually, that the present invention resides. More specifically, the composition embodying the present invention involves a mixture of active salts, namely sodium hydrosulfite ($Na_2S_2O_4$) and sodium bisulfite ($NaHSO_3$), or sodium metabisulfite ($Na_2S_2O_5$) also known as sodium pyrosulfite. While reference has been made to the sodium salts, it should be understood that other metal salts of a similar type can be employed, such as the potassium sulfite salts. When a mixture of these salts, such as the sodium hydrosulfite and sodium bisulfite, is stored in dry powder form, the salts are reasonably stable although they should be maintained in a sealed container. Upon addition to or in the presence of water, however, the salts are dissolved thereby becoming capable of reacting with rust, iron oxide or other stains present whether on sinks, porcelain containers, water softeners, walls, automobiles or the like. This stain removing composition when dissolved in water is believed to react with rust, for example, according to the following equation representing the aqueous reaction:

$$Na_2S_2O_4 + 3NaHSO_3 + Fe_2O_3 \longrightarrow 2FeSO_3 + 2Na_2SO_3 + H_2O$$

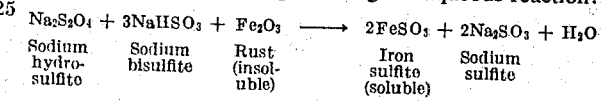

It is believed that in the reaction the sodium hydrosulfite is effective to reduce the insoluble rust (ferric iron oxide) to a lower iron oxide which then reacts with the bisulfite and is changed to the more soluble form of ferrous sulfite. The metabisulfites are similar in action to the bisulfites and have been regarded as the hydrate of bisulfites, and the reaction given above would be the same when a metabisulfite is employed.

Figure 2:
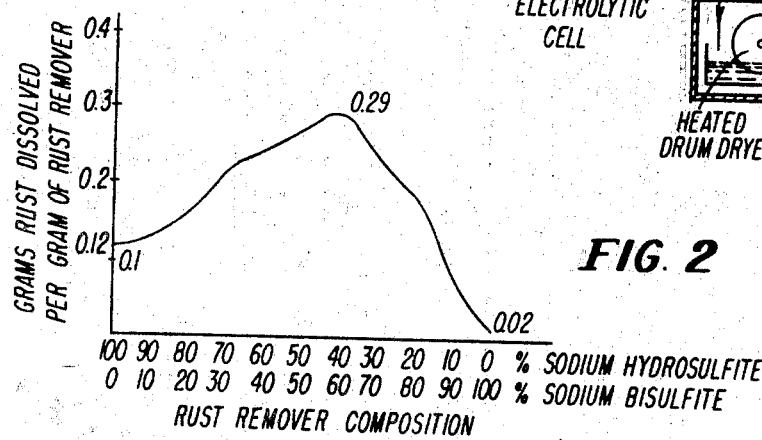
FIG. 2 is a chart illustrating the amount of rust dissolved as a function of the rust remover composition.

It has been discovered that the composition of the present invention is most effective in dissolving rust when the mixture contains about 60% sodium bisulfite and about 40% sodium hydrosulfite. The composition of the invention is not limited to this specific ratio, however, as it has also been found that the ratio of sodium hydrosulfite to sodium bisulfite may be varied without destroying the effectiveness, and especially the rust and stain removing capabilities, of the composition. It also is often desirable to adjust the ratio in accordance with the stain being treated, the solution in which the treatment is carried out, and the conditions under which the treatment is conducted. Referring more specifically to the case of dissolving and removing rust, FIG. 2 is a chart illustrating the relationship between the composition embodying the invention and the amount of rust dissolved. The chart of FIG. 2 gives the relationship between the amount of rust dissolved and the rust remover composition. As shown on this chart, sodium hydrosulfite is capable by itself of removing and dissolving rust to some extent. For example, the amount of rust dissolved per gram of rust removed when 100% sodium hydrosulfite is employed, is indicated as 0.12 gram. When, however, a rust remover composition containing 40% sodium hydrosulfite and 60% sodium bisulfite is employed, 0.29 gram of rust was dissolved per gram of rust remover.

While it will be appreciated by those skilled in the art that the additions of even small amounts of sodium bisulfite to the sodium hydrosulfite would effect an improvement in the amount of rust dissolved, it has been found for most applications and it is applicant's preferred range, that the rust remover composition contained between 25 and 75% sodium hydrosulfite and the remainder bisulfite or equivalent such as sodium metabisulfite.

Under the usual conditions employed for water softener, it has been found that recharging of an iron fouled softener, or a softener in the presence of water containing iron will not remove precipitated iron rust. In the operation of an ion exchange resin or zeolite water softener with water that contains quantities of iron, particularly dissolved ferrous iron, there is a gradual accumulation of iron rust on the ion exchange material. This is believed to be caused by air oxidation of ferrous iron to ferric iron, after which the rust precipitates from the water. The rust precipitation appears to grow on the internal surfaces of the porous grains of the ion exchange mineral and thereby gradually clog the pores of the grains and coat the surfaces so that the ion exchange capacity for softening water is substantially reduced. In addition, it has been found that some of the rust becomes dislodged during normal use of the softener. This is particularly obvious immediately after the softener has been recharged with salt brine so that rusty soft water is produced.

A solution to this problem has been sought, and various cleaning agents or additives that could be incorporated in the regenerating salt in order to solubilize the iron rust during the brine regeneration have been suggested. The requirements of such a material are that it be compatible with salt, be reactive and present in small concentrations, react rapidly, be non-corrosive to iron and other metals used in the equipment, be essentially neutral in pH, be non-toxic, be easily washed from and removed from the softener bed, have little or no odor or taste, be non-injurious to the mineral, and be inexpensive and easy to use. Among the suggested agents for this purpose is the compound sodium hydrosulfite. While this material has been successful to some extent, it has disadvantages in that it is slow to act, requires a high concentration to effect any degree of iron removal, creates an odor, and sometimes leaves a black precipitate which is difficult to wash out of the softener or off of the surface being cleaned.

Figure 3:
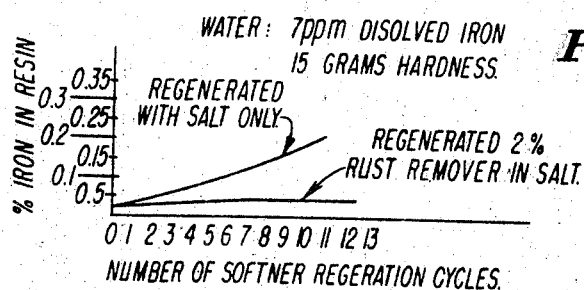
FIG. 3 is a chart illustrating the effect of using the rust removing composition embodying the invention in a water treatment regenerating composition.

The composition embodying the invention as described above has been found to have particular utility in removing iron rust from water softening and water treatment equipment. The rust remover composition can be added by itself or along with the salt employed to regenerate the ion exchange resin within the equipment. The use of the rust remover in a brine solution is extremely effective not only in removing rust deposits but also, when used continuously in small amounts, is effective to keep the iron level extremely low. This effect is shown in FIG. 3. When a water softener is regenerated with salt only, the amount of iron on the water softening agent or ion exchange resin builds up, as shown in the upper curve of FIG. 3, in proportion to the number of regeneration cycles. This accumulation of iron rust can be avoided, however, by employing approximately 2% by weight of the above described rust remover composition, containing 40% sodium hydrosulfite and 60% sodium bisulfite, with the salt used for regeneration. Using such a composition, the percentage of iron on the ion exchange resin remains low as shown by the lower line of FIG. 3.

While the use of rust remover composition in the ion exchange resin regeneration salt in an amount of about 2% by weight has been given as an example, it will be appreciated that the amount of rust remover can be varied according to the amount of iron in the water and the condition of the water softening equipment. If the iron content of the water is low, as little as 0.5% by weight rust remover in the salt can be employed. On the other hand, if badly fouled equipment is to be cleaned, the amount of rust remover in the regeneration salt might desirably be as much as 20%.

For use in ion exchange resin equipment, the rust remover composition can be mixed with dry salt (NaCl) and the mixture tabletted. Further, it is not necessary that the sodium hydrosulfite and sodium bisulfite or metabisulfite be added as a mixed powder or at the same time. The ingredients can be added separately, although both must be present at the same time in order to effect the desired reaction. The rust remover composition embodying the present invention is stable in water or a brine solution for only a short time. For this reason, it is preferably kept and stored as a dry powder and for this reason tabletting the powder with a water softener regenerating composition such as salt is desirable.

To use the rust removing composition, at the time the salt is added to the water softener a measured amount of the rust remover is added. If a brine is to be used to regenerate the equipment, it is necessary to prepare only as much brine and rust removing agent as can be used in the one regeneration. To clean a water softener bed which has become fouled with iron, the equipment should be backwashed to remove as much free rust as possible. The softener is then recharged with salt brine in the usual manner. Following the brine, a rust remover mixture plus a small amount of salt is passed through the softener to dissolve the fixed rust. The amount of rust remover composition employed will depend upon the condition of the equipment. It has generally been found that where the use of the rust remover has not been continuously employed and where the equipment is heavily coated with rust, about one pound of rust remover mixed with five pounds of salt, added either as a solid or dissolved in two gallons of water and added as a brine, are recommended per cubic foot of resin. Additional treatments can be employed until the softener mineral is free from rust.

Among the various ways in which rust and stain removing compositions embodying the invention can be used are in household detergents, cleansers, soaps and the like. The dry powder rust remover is preferably incorporated in a small amount, say from about 1 to about 5% by weight, into the powdered cleansing agent and the material kept in a closed container prior to use. It has been found that by incorporating the stain remover embodying the invention into detergents, for example, which are used in automatic washing machines, rust stains can be effectively removed from clothes and fabrics without damaging the cloth or the colors thereof.

Incorporation of the rust remover embodying the invention into cleansers and cleaning agents in general has been found to be extremely effective in removing stains from sinks, plumbing equipment, and the like. The material can also be employed on walls, floors, automobiles, and mechanical equipment where rust accumulates. It is preferable that the amount of stain remover in the cleansers be somewhat greater than in detergents and soaps, and it has been found that the use of amounts somewhere in the range of about 5 to about 10% by weight produces a satisfactory product from most cleaning operations. Where the rust deposits are heavy, somewhat more of the stain removing agent must be used. It has been found, moreover, that the stain removing agent is more effective on heavy deposits when used directly as a damp powder or in paste form. For example, application to a rusted surface is made by wetting the surface, applying an amount of the stain removing composition to a damp cloth, and rubbing the surface much in the manner of using an abrasive cleanser. The stain removing composition can also be employed in an admixture with a colloid forming substance such as carboxymethyl cellulose. When this composition is mixed with a small amount of water, a paste is formed which can be applied to heavily stained or rusted surfaces. The surface is then thoroughly rinsed. If further applications of the rust remover are required, the foregoing steps are repeated. After the surface has been cleaned, it is protected with a suitable paint or lacquer.

While the foregoing gives some illustrations of the possibilities for using the stain and rust remover of the present invention, other uses and applications will doubtless occur to those skilled in the art, as will modifications of the composition itself. It is accordingly the intention to cover such modifications, alternative uses and equivalents as determined by the spirit and scope of the appended claims.

To improve the reaction of the rust or stain removing agent with the corroded metal surfaces, stained surfaces, etc., a surface active agent or synthetic detergent is desirably added. Such an agent should be a dry powder which is readily soluble when water is added to produce an active surface wetting stain removing composition. Among the surface active agents finding particular utility are the alkyl aryl sulfonates and alkyl sulfates such as lauryl sulfate. These compositions, generally the sulfated and sulfonated anionic surface active agents, exist in the form of a dry powder which can be readily mixed with the dry powder stain remover composition described above.

A dry powder composition of this character can be made with between about 2 and about 5% by weight of a surface active agent such as sodium alkyl aryl sulfonate. Other compositions can, of course, be produced using different surface acting agents. Thus, various anionic agents such as the carboxylic acids, sulfates, alkane sulfonic acids and alkyl aromatic sulfonic acids can be employed. Cationic agents such as amines and quarternary ammonium compounds might be employed, and non-ionic agents such as polymeric propylene oxide-ethylene oxide agents. Also, alkyphenol-ethylene oxide condensates afford surface active and detergent action.

If the stain removing composition is to be incorporated into a detergent such as the lauryl sulfate type of synthetic detergent, a small amount of the stain removing composition is added to the synthetic detergent powder. For removing most stains from clothes, fabrics and the like, it has been found that about 0.5 to 2% by weight of the stain remover in a detergent gives satisfactory results. If the stains are heavy, however, additional amounts of the stain remover may be required.

Figure 1:
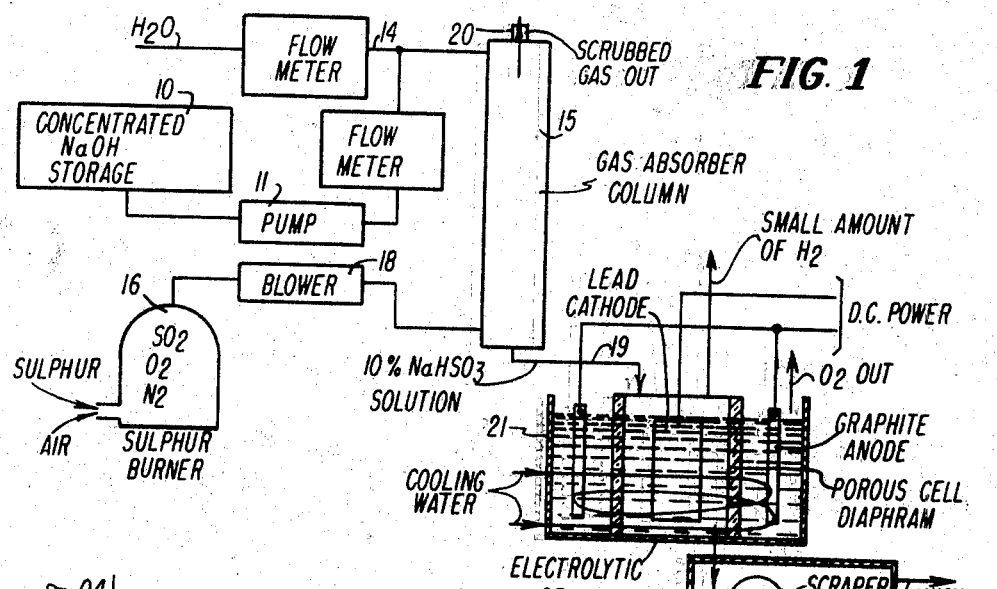
FIGURE 1 is a schematic flow diagram illustrating a process for producing the rust and stain removing composition embodying the present invention.

Referring to FIGURE 1, there is shown a process which can be employed for manufacturing a rust removing composition embodying the foregoing invention. The basic starting materials for such a process are commercially produced sulfur and caustic soda (NaOH). The caustic soda is stored in a suitable tank 10 from which it is pumped, through a suitable pump 11, along with the required amount of water from a line 14, to the top of a gas absorber column 15. The sulfur is burned in a burner 16 and the sulfur dioxide produced passes through a blower 18 to the bottom of the gas absorber column 15. The sulfur dioxide is absorbed in the caustic soda and water to produce a 10% sodium bisulfite solution, which leaves the gas absorber column through a bottom line 19. The scrubbed gases pass out of the top of the column through an outlet 20.

The 10% sodium bisulfite solution is then electrolyzed in an electrolytic cell 21. The electrolytic cell can be of any construction known in the art. Shown diagrammatically in FIG. 1 is a cell containing the usual graphite anodes 22 and the lead cathodes 23 connected to a source of D.C. power. Between the anode and cathode is positioned a porous cell diaphragm or semi-permeable membrane 24. During the process of electrolysis, oxygen is removed from the sodium bisulfite in solution, and the oxygen ions pass through the diaphragm and are discharged as oxygen gas from the anode. This results in the reduction of some of the sodium bisulfite to sodium hydrosulfite and water. The reduction is carried to the extent where approximately 40% of the sodium bisulfite is reduced to sodium hydrosulfite, the remaining 60% of sodium bisulfite passing unchanged through the electrolytic cell 21.

The partially reduced bisulfite-hydrosulfite solution is then directed to a suitable vacuum drier 25 and the composition is removed from the drier as a dry powder having the desired proportions of sodium bisulfite and sodium hydrosulfite. This composition can be used in the various ways described above.

I claim as my invention:

1. A rust stain removing composition consisting essentially of about 40% by weight sodium hydrosulfite and about 60% by weight sodium bisulfite.

2. A water softener regenerating composition consisting essentially of sodium chloride regenerating salt and about 2% by weight of a rust removing composition consisting essentially of about 40% by weight sodium hydrosulfite and about 60% by weight sodium bisulfite.

3. A water softener regenerating composition in tabletted form consisting essentially of sodium chloride regenerating salt and between about 0.5% and about 20% by weight of a rust removing composition consisting essentially of about 40% by weight sodium hydrosulfite and about 60% by weight sodium bisulfite.

4. A composition consisting essentially of surface active agent and an amount of from about 0.5 to about 20% by weight of the rust stain removing composition of claim 1.

5. A composition consisting essentially of surface active agent and an effective amount of a rust stain removing composition consisting essentially of from about 40% by weight of an alkali hydrosulfite, a compound selected from the group consisting of the hydrosulfite of sodium and potassium and about 60% of compound selected from the group consisting of the bisulfite and metabisulfites of sodium and potassium.

References Cited by the Examiner

UNITED STATES PATENTS

| | | | |
|---|---|---|---|
| 777,669 | 12/04 | Frank | 204—92 |
| 1,151,416 | 8/15 | Stevenot | 252—105 |
| 1,918,873 | 7/33 | Scribner | 252—188 XR |
| 2,273,799 | 2/42 | Janes et al. | 204—92 |
| 2,393,865 | 1/46 | Wassell | 252—105 |
| 2,995,522 | 8/61 | Joyce | 252—188 XR |

FOREIGN PATENTS 666,932  6/29  France.

JULIUS GREENWALD, *Primary Examiner.*

ALBERT T. MYERS, *Examiner.*